United States Patent Office 3,486,370
Patented Dec. 30, 1969

3,486,370
METHOD AND DEVICE FOR MEASURING THE GAS CONTENT OF A FLOWING TWO-PHASE MIXTURE
Christian Chedeville and Noel Lions, Manosque, and Marcel Rosso, Saint-Julien, France, assignors to Commissariat a l'Energie Atomique, Paris, France
Filed Feb. 6, 1967, Ser. No. 614,191
Claims priority, application France, Feb. 22, 1966, 50,486
Int. Cl. G01n 9/24
U.S. Cl. 73—67.6                              2 Claims

ABSTRACT OF THE DISCLOSURE

A method for measuring the gas content of a flowing two-phase mixture consisting of a liquid in which said gas is present in the state of bubbles, wherein said method comprises determining the viscosity of sound in said mixture at two different static pressures, from which the mean radius of gas bubbles and the gas content are deduced.

---

This invention relates to a method for measuring the gas content of a flowing two-phase mixture consisting of a liquid in which said gas is present in the state of bubbles, and is also concerned with a device for the practical application of said method or any like method. Said method and device are primarily although not exclusively intended for the determination of small quantities of inert gas such as argon, for example, which are contained in liquid coolants such as liquid sodium which are utilized in some types of nuclear reactor.

The method according to the invention makes use of the variations in the velocity of sound in the two-phase mixture as a function of the gas content.

It is a known fact that the velocity of sound is directly influenced by the concentration of liquid or solid particles in suspension in a liquid and especially by the concentration of gas bubbles. It has already been proposed to apply this principle for the purpose of measuring the concentration of gas bubbles. However, the measurements taken in accordance with known methods always remain very inaccurate and this has been proved to be due to the fact that no allowance is made for the influence exerted by the dimensions of gas bubbles.

The object of the invention is to eliminate this drawback by making it possible to determine not only the velocity of sound in the two-phase mixture but also the mean dimensions of the gas bubbles. The invention accordingly proposes a method for measuring the gas content of a flowing two-phase mixture consisting of a liquid in which said gas is present in the state of bubbles, wherein said method comprises the determination of the velocity of sound in said mixture and is characterized in that said determination is performed at two different static pressures, from which the mean radius of gas bubbles and the gas content are deduced.

The present invention is also directed to a device for the practical application of said method which is characterized in that it comprises: a pipe of substantially circular cross-section through which the two-phase mixture is intended to flow and which has two horizontal sections, means for producing different static pressures within said sections, and means for measuring the velocity of sound in the two-phase mixture at the level of each of said sections.

A better understanding of the invention will be gained by consideration of the following description which is given by way of example and not in any limiting sense. In this description, the numerical examples relate more specifically to the application of the method according to the invention to the determination of the proportion of argon which is present in the state of bubbles either in water or liquid sodium. This description refers to the accompanying drawings, in which.

In considering a two-phase mixture flowing at a mean velocity $U_m$ and consisting of a liquid containing a volume percentage $\alpha$ of gas in the state of bubbles which are assumed to be spherical and separate, it is possible to calculate the velocity of sound in said mixture as a function of the gas content.

In the cases usually met with (particularly in nuclear power plants of the type in which a flow of liquid sodium utilized as coolant may contain bubbles of inert gas, the proportion of which it is desired to measure), the static pressure of the two-phase mixture remains of a low order and usually less than 10 bars; and practically speaking, the gas content is always less than 50%.

Under these conditions, and taking no account of the solubility of the gas in the liquid, it is demonstrated that the velocity of propagation of sound in the flowing two-phase mixture is given by the following Equation 1:

$$a + U_m = \sqrt{\frac{B_L}{[(1-\alpha)\rho_L + \alpha\rho_G]\left[1 - \alpha + \frac{\alpha B_L}{P + \frac{4T}{3r}}\right]}} \quad (1)$$

wherein:
$a$ is the velocity of sound in the mixture which is assumed to be at rest,
$U_m$ is the flow rate,
$\alpha$ is the volume percentage of gas contained in the mixture,
$\rho_L$ and $\rho_G$ are the specific densities of the liquid and of the gas respectively, under the conditions of temperature and pressure considered,
$B_L$ is the converse of the coefficient of compressibility of the liquid,
$P$ is the static pressure of the mixture,
$T$ is the surface tension at the liquid-gas interface,
$r$ is the equivalent mean radius of the gas bubbles.

It is apparent that, for each value of the static pressure $P$, the velocity of sound is a function of the gas content $\alpha$ and of the equivalent mean radius $r$ of the bubbles. The area which is representative of this function can be defined by a system of curves of the kind shown in FIG. 1.

Figure 1:
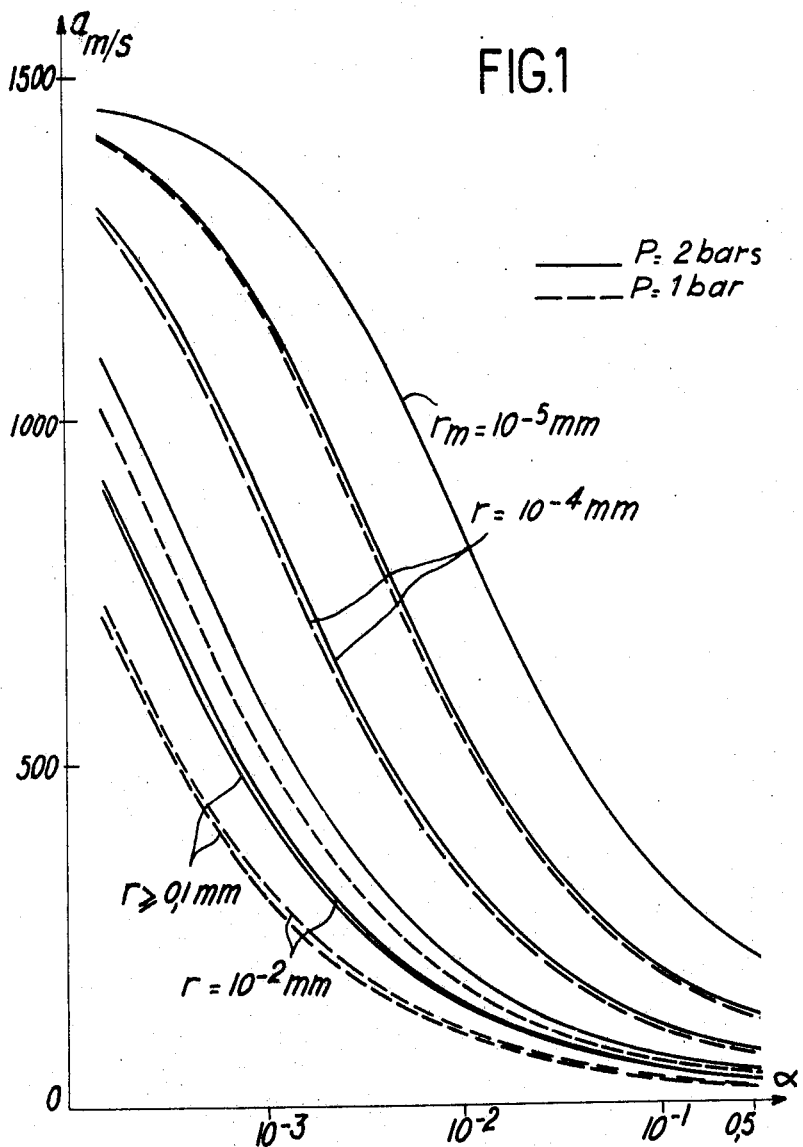
FIGS. 1 and 2 represent the variations in the velocity of sound in the two-phase mixture under consideration as a function of the gas content.

The curves which are plotted in FIG. 1 correspond to two-phase water-argon mixtures at the ordinary temperature $t=20°$ C. and at pressures $P=2$ bars and $P=1$ bar; said curves are limited to $0 \leqslant \alpha \leqslant 50\%$. However, emphasis should be laid on the fact that, according to Equation 1 above, curves of similar shape would be obtained with any other two-phase mixture.

FIG. 1 shows that, when the bubble radius $r$ increases, the curves which correspond to different radii $r$ in respect of a same pressure P come closer together. In the particular case considered, the curves practically coincide if $r \geqslant 0.1$ mm.

Beyond this value, the velocity of sound becomes practically independent of the bubble radius. In the case of a given temperature $t$, it is then merely necessary to measure the static pressure P and the velocity of sound in the two-phase mixture in order to deduce therefrom the gas contents $\alpha$.

Referring to Equation 1, it is also possible to establish that, if the bubble radius $r$ becomes sufficiently large to permit the surface tension phenomena at the liquid-gas interface to modify the gas pressure within a bubble to an extent which is negligible compared with the static pressure of the gas, Equation 1 becomes:

$$a \pm U_m = \sqrt{\frac{B_L}{[(1-\alpha)\rho_L + \alpha\rho_G]\left[1-\alpha+\frac{\alpha B_L}{P}\right]}} \quad (2)$$

Figure 2:
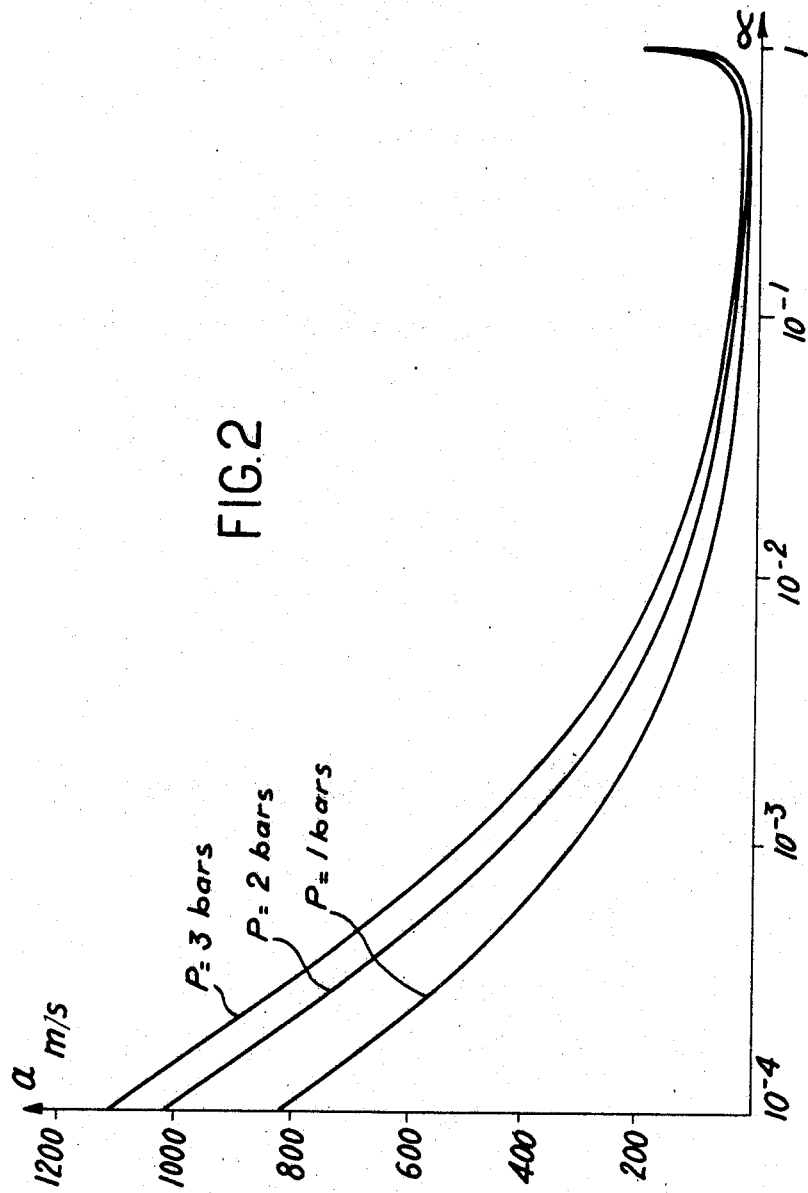

The representative curves of this equation have been plotted in FIG. 2 in respect of static pressures P of 1, 2 and 3 bars in the case of a two-phase mixture of water and argon at the ordinary temperature of 20° C. When the gas content $\alpha$ remains smaller than a maximum value of 50%, these curves make it possible to determine $\alpha$ without ambiguity if the pressure P and the velocity of sound in the two-phase mixture are shown.

In the more general case wherein $r < 0.1$ mm. (this value is given by way of example and corresponds to the case of a water-argon mixture at 20° C.), the mean bubble radius must also be determined approximately.

FIG. 1 makes it possible in addition to define a further particular value of the bubble radius. It is apparent from the figure that, if the bubble radius $r$ decreases, the curves corresponding to different values of the pressure P draw nearer to each other. If $r$ becomes smaller than a limiting value $r_m$ which is equal in the particular case considered to approximately $10^{-5}$ mm., then these curves coincide or, in other words, the velocity of sound is virtually independent of the static pressure.

Provided that the mean bubble radius is limited to the regions in which $r > r_m$, FIG. 1 shows that, if the parameters $t$, $U_m$ and P are established, there corresponds to each value of the velocity of sound a value of the gas content $\alpha$ which is comprised between two limits $\alpha$ ($r_{\infty}$) and $\alpha$ ($r_m$) and which is a function of the mean bubble radius $r$. The value $\alpha$ ($r$) corresponds to $r \geqslant 0.1$ mm. The value $\alpha$ ($r_m$) corresponds to the limiting value $r_m$ which was defined earlier.

In each particular case, the mean bubble radius $r$ can be located in relation to $r_{\infty}$ and $r_m$ if the velocities of sound $a_1$ and $a_2$ in the two-phase mixture at two different static pressures $P_1$ and $P_2$ are already known. It will be readily apparent that, if $a_1$ and $a_2$ are not appreciably different, then $r \leqslant r_m$, but $r$ cannot be determined with greater accuracy.

Figure 3:
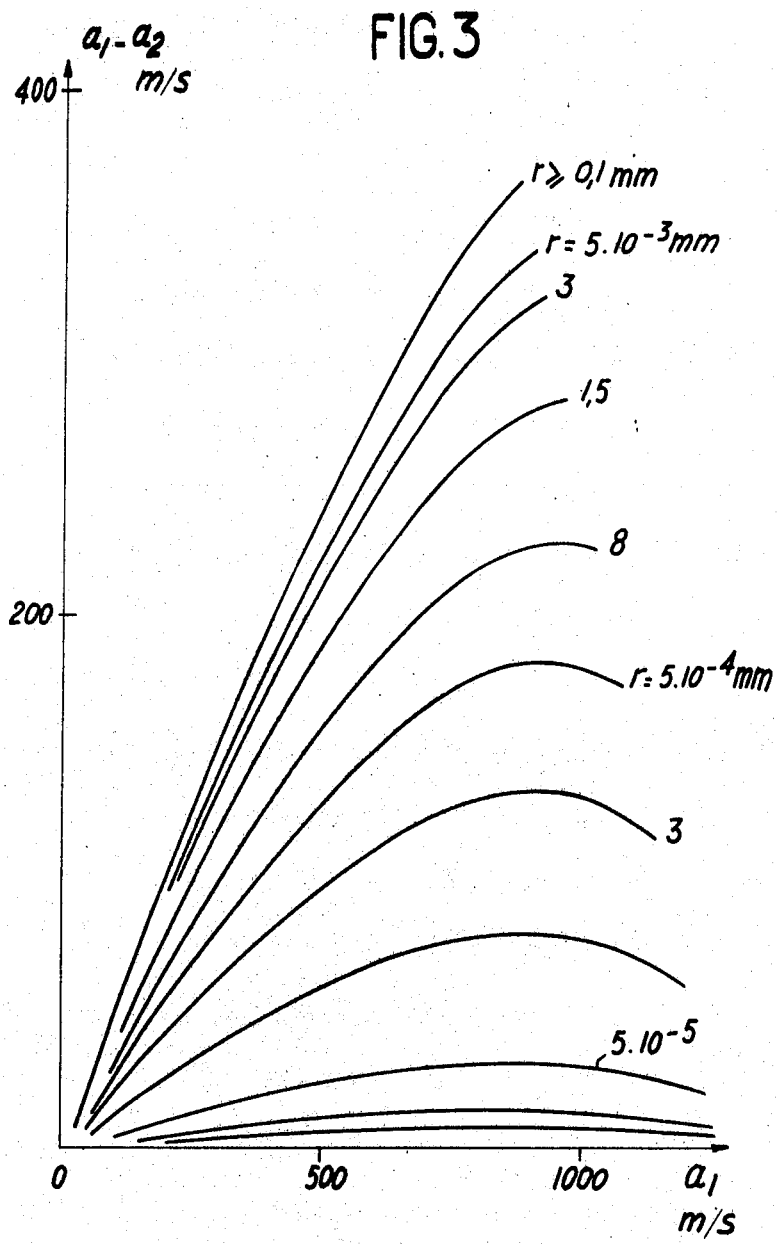
FIG. 3 represents as a function of the mean radius of the gas bubbles the variations in the difference between the velocities of sound as measured in respect of two different static pressures.

The curves of FIG. 3 which are established as a result of calculation in the case of water-argon mixtures at 20° C. indicate in respect of different values of $r$ the variations in the difference $a_1 - a_2$ as a function of $a_1$ when $P_1 = 2$ bars and $P_2 = 1$ bar.

In accordance with the foregoing description, the method which is contemplated by the invention and which is applied to the measurement of the gas content in the water-argon mixtures considered consists in the case which most commonly arises in determining the velocity of sound, the mean flow velocity of the mixture $U_m$ and the temperature in respect of two different static pressures P. In each case, the velocity of sound $a$ is deduced from the measurement of the sum or of the difference $a + U_m$, depending on whether the sound is propagated in the direction of flow or in the opposite direction.

The system of curves of FIG. 3 (or a similar system if $t$ is different from 20°) accordingly makes it possible to deduce the mean radius $r$ of the gas bubbles when the difference $a_1 - a_2$ in the velocities of sound at predetermined pressures is known. The system of curves of FIG. 1 then makes it possible to determine the gas content $\alpha$ as a function of $r$ and $a_1$ (or $a_2$).

Figure 4:
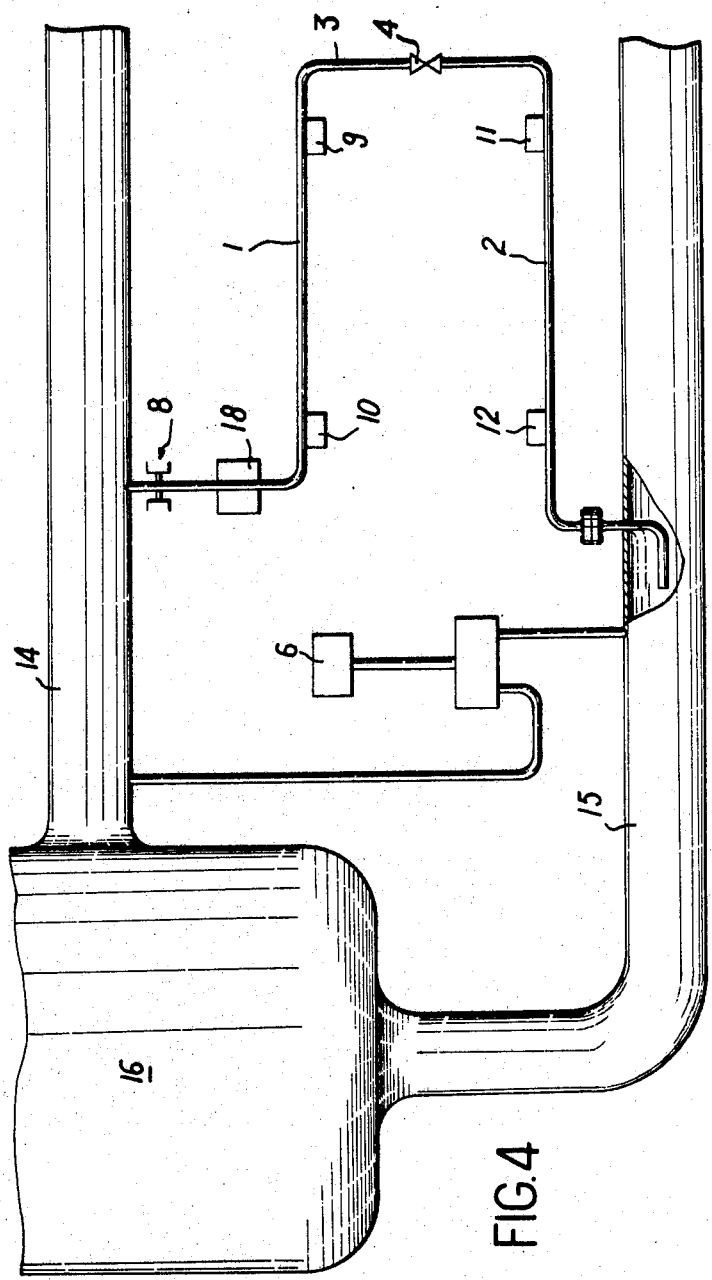
FIG. 4 illustrates one partciular embodiment of the device according to the invention which is employed for the purpose of measuring the gas content in a liquid sodium circulation system.

FIG. 4 shows by way of example one particular embodiment of a device for the practical application of this method. The device under consideration is constituted by a pipe of circular cross-section and of small diameter in which is circulated the two-phase mixture under analysis. Said pipe comprises two horizontal sections 1 and 2 for the purpose of taking measurements at these locations. The two sections referred-to are connected by means of a third section 3 comprising a valve 4 which serves to produce a predetermined pressure drop between the sections 1 and 2.

Thermometers (not shown in the figure) are placed, for example, upstream of the first section and downstream of the second section. They serve to measure respectively the temperatures $t_1$ and $t_2$ of the two-phase mixture at the level of each section, or their mean value. A pressure gauge (gage) 6 which can be connected at will into each section serves to measure the static pressures $P_1$ and $P_2$. The velocity of the mixture within the pipe is deduced from the indications of a flow meter 8.

Finally, in order to permit the measurement of the velocity of sound in each of the two sections, these latter are fitted with piezoelectric transducers 9 and 10 in the case of the first section, 11 and 12 in the case of the second. Pressure pulses are communicated to one end of the pipe and the signals delivered by each pair of piezoelectric transducers are recorded on an oscilloscope which is fitted with a photographic camera (these latter having been omitted from the drawings). The measurement of the phase-displacement between the signals produced by the transducers 9 and 10 on the one hand and by the transducers 11 and 12 on the other hand makes it possible to deduce the speed of propagation of sound in the corresponding pipe section.

In the particular case of FIG. 4, the device hereinabove described is connected to the suction pipe 14 and delivery pipe 15 of a mechanical pump 16 which conveys the liquid sodium through the coolant circuit of a nuclear reactor. The fluid is taken from the delivery side of the pump, either in the axis of the flow or at the top of the horizontal pipe.

The flow meter 8 employed is of the electromagnetic type. Similarly, the pressure pulse generator is an electromagnetic pump 18.

As will be understood, the invention is not limited in any respect to the particular examples which have been described in the foregoing. The systems of curves have been given in the case of a water-argon mixture. These curves have been plotted on the basis of a theoretical calculation but have been verified experimentally. However, curves of similar shape can be plotted in the case of any other two-phase mixture.

What we claim is:

1. A method for measuring the gas content of a flowing two-phase mixture consisting of a liquid in which said gas is present in the state of bubbles at two different static pressures comprising the steps of determining for each of said pressures the velocity of sound in said mixture between two predetermined points in a direction parallel to the flow of said flowing mixture, then determining the mean flow velocity of the two-phase mixture between said points, then measuring the mean temperature of the two-phase mixture at two different static pressures and then obtaining the mean radius of gas bubbles and the gas content, the mean bubble radius being determined by reference to curves representing in respect of different values of the parameter which is constituted by the mean bubble radius, the variation in the difference between the two velocities of sound which are measured as a function of one of said velocities and the gas content being determined by reference to curves representing the variation in velocity of sound as a function of the gas content in respect of predetermined pressure and mean bubble radius.

2. A device for measuring the gas content of a two-phase mixture comprising a pipe of substantially circular cross-section through which the two-phase mixture flows, two horizontal sections for said pipe, means for producing different static pressures within said sections, means for producing a pressure drop in said pipe between said pipe sections, means for measuring the mean temperature of the two-phase mixture in said pipe, means for measuring the mean flow velocity of said mixture between said pipe sections and means for measuring the velocity of sound in the two-phase mixture at the level of each of said sections in a direction parallel to the flow of said flowing mixture, the mean bubble radius being determined by reference to curves representing in respect of different values of the parameter which is constituted by the mean bubble radius, the variation in the difference between the two velocities of sound which are measured as a function of one of said velocities and the gas content being determined by reference to curves representing the variation in velocity of sound as a function of the gas content in respect of predetermined pressure and mean bubble radius.

References Cited

FOREIGN PATENTS

| 1,197,130 | 6/1959 | France. |
| 574,819 | 1/1946 | Great Britain. |
| 805,544 | 12/1958 | Great Britain. |

RICHARD C. QUEISSER, Primary Examiner

JOHN R. FLANAGAN, Assistant Examiner

U.S. Cl. X.R.

73—24